(12) United States Patent
Kuraki et al.

(10) Patent No.: US 7,953,298 B2
(45) Date of Patent: May 31, 2011

(54) IMAGE MAGNIFICATION DEVICE, IMAGE MAGNIFICATION METHOD AND COMPUTER READABLE MEDIUM STORING AN IMAGE MAGNIFICATION PROGRAM

(75) Inventors: Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 12/272,353

(22) Filed: Nov. 17, 2008

(65) Prior Publication Data

US 2009/0074320 A1    Mar. 19, 2009

Related U.S. Application Data

(62) Division of application No. 10/949,806, filed on Sep. 27, 2004, now abandoned.

(30) Foreign Application Priority Data

Mar. 31, 2004 (JP) .................................. 2004-107480

(51) Int. Cl.
*G06K 9/32* (2006.01)
(52) U.S. Cl. ......... 382/300; 382/298; 382/299; 382/261
(58) Field of Classification Search .......... 382/260–269, 382/298–301; 358/525
See application file for complete search history.

(56) References Cited

U.S. PATENT DOCUMENTS

| | | | | | |
|---|---|---|---|---|---|
| 5,363,213 | A | * | 11/1994 | Coward et al. | 382/299 |
| 5,867,606 | A | * | 2/1999 | Tretter | 382/261 |
| 5,880,767 | A | | 3/1999 | Liu | |
| 5,889,895 | A | * | 3/1999 | Wong et al. | 382/300 |
| 5,949,915 | A | * | 9/1999 | Yamada | 382/260 |
| 6,201,613 | B1 | * | 3/2001 | Zhang et al. | 358/1.9 |
| 6,466,702 | B1 | * | 10/2002 | Atkins et al. | 382/300 |
| 7,031,544 | B2 | * | 4/2006 | Sumitomo et al. | 382/254 |
| 7,149,369 | B2 | * | 12/2006 | Atkins | 382/299 |
| 2002/0164082 | A1 | * | 11/2002 | Sumitomo et al. | 382/254 |
| 2002/0168115 | A1 | * | 11/2002 | Sumitomo et al. | 382/254 |
| 2003/0185463 | A1 | * | 10/2003 | Wredenhagen et al. | 382/300 |
| 2004/0013320 | A1 | * | 1/2004 | Atkins et al. | 382/300 |
| 2006/0126960 | A1 | * | 6/2006 | Zhou et al. | 382/261 |

FOREIGN PATENT DOCUMENTS

| | | |
|---|---|---|
| EP | 1 355 271 A1 | 10/2003 |
| JP | 2000-339450 | 12/2000 |
| JP | 2002-149105 | 5/2002 |
| WO | WO 02/05208 A2 | 1/2002 |

OTHER PUBLICATIONS

Gonzalez & Woods, "Digital Image Processing", $2^{nd}$ Edition, Prentice Hall, 2002, pp. 220-230.

(Continued)

*Primary Examiner* — Bhavesh M Mehta
*Assistant Examiner* — Sean Motsinger
(74) *Attorney, Agent, or Firm* — Staas & Halsey LLP

(57) ABSTRACT

A high-definition magnified image is obtained by simple computation. A magnified image is obtained by obtaining a deteriorated image on the basis of an input original image, determining enhancement filters used for individual small areas of the original image using the deteriorated image at least, performing a filtering process by applying the filters thus determined to the individual small areas to achieve enhancement, and interpolating the image for magnification.

4 Claims, 9 Drawing Sheets

OTHER PUBLICATIONS

European Office Action dated Jan. 26, 2010 and issued in corresponding European Patent Application 04 255 886.6.

Dube S., et al., "An Adaptive Algorithm for Image Resolution Enhancement", Systems and Computers, 2000, vol. 2, pp. 1731-1734.

Chang, S.G., et al., "Resolution Enhancement Of Images Using Wavelet Transform Extrema Extrapolation", Image and Multi-Dimensional Signal Processing /Signal Processing Applications Development, vol. 4, Conf. 20, 1995, pp. 2379-2382.

Baker, S., et al., "Limits on Super-Resolution and How to Break Them", vol. 9, No. 24, 2002, pp. 1167-1183.

European Search Report dated Mar. 4, 2005 in corresponding European Patent Application No. 042558866-1224.

U.S. Appl. No. 10/949,806, filed Sep. 27, 2004, Kensuke Kuraki, Fujitsu Limited.

Daisuke Sekiwa and Akira Taguchi, "Enlargement of Digital Images by Using Multi-Neural Networks based on Local Dispersion", The Institute of Electronics, Information and Communication Engineers Reports (J81-A) No. 4, Japan, the Institute of Electronics, Information and Communication Engineers Society, Apr. 25, 1998, vol. J81-A, No. 4, p. 790-798 and its partial translation: p. 795: left column, line 4 from the bottom to right column, line 8 from the bottom (10 pages) (1 page English Translation). Partial.

Notice of Reason for Rejection dated Nov. 30, 2010 with its English translation issued in the corresponding Japanese Patent application No. 2005-099401 (2 pages) (3 pages English Translation).

* cited by examiner

FIG. 7

$$fi = \begin{array}{|c|c|c|} \hline C11 & C12 & C13 \\ \hline C21 & Ni & C23 \\ \hline C31 & C32 & C33 \\ \hline \end{array}$$

Cij ARE FUNCTIONS OF Ni AND VARY WITH THE VALUE OF Ni

IMAGE MAGNIFICATION DEVICE, IMAGE MAGNIFICATION METHOD AND COMPUTER READABLE MEDIUM STORING AN IMAGE MAGNIFICATION PROGRAM

CROSS-REFERENCE TO RELATED APPLICATION

This application is a divisional of and claims priority to U.S. application Ser. No. 10/949,806, filed Sep. 27, 2004 now abandoned, and incorporated by reference herein.

BACKGROUND OF THE INVENTION

The present invention relates to a technique of magnifying images, which is applied, for example, to devices like mobile phones and PDAs (personal digital assistants) and to general software for displaying images.

Various methods for magnification of images have been proposed. Most common methods apply filtering to an image after (or while) up-sampling the image. Bilinear interpolation and bicubic interpolation are the most famous examples of such methods.

However, these methods tend to produce blurred magnified images. This is because high-frequency components are lost during image magnification.

To solve the problem, Non-Patent document 1 describes a method in which, after magnification of an image, an enhancement/estimation process is performed for lost high-frequency components to realize high-definition image magnification. Also, Non-Patent document 2 describes a method in which signal pattern after magnification is estimated on the basis of previously learned association between image signal pattern before being magnified and signal pattern after magnification. Alternatively, inventions similar to the present invention are described in Non-Patent document 3 and Patent document 1. Supposing that an image before magnification is a reduced and deteriorated version of a magnified image, pixel values for the magnified image are estimated. In the process, since each pixel value of the magnified image cannot be determined uniquely, a constraint condition is set for the search of a solution space, and the image is magnified by obtaining maximum (minimum) solutions under the constraint condition. Smoothness of neighboring pixels is often used for the constraint condition, and the resultant solution (i.e. magnified image) therefore tends to be blurred with high-frequency components lost. However, Non-Patent document 3 and Patent document 1 allow the solution search without losing high-frequency components by using constraint conditions utilizing learned data.

Prior arts that relate to the present invention include the techniques disclosed in Patent documents 1 and 2 and Non-Patent documents 1 to 3 shown below, for example.

[Patent document 1] JP 2000-339450 A

[Patent document 2] JP 2002-149105 A

[Non-Patent document 1] H. Greenspan, C. H. Anderson, and S. Akber, "Image Enhancement by nonlinear extrapolation in frequency space", IEEE Trans. on Imag. Proc., vol. 9, no. 6, June, 2000.

[Non-Patent document 2] Tetsujiro Kondou, "Reality Creating Technique—Digital Reality Creation—", The Journal of the Institute of Image Electronics Engineers of Japan, vol. 26, no. 6, 1997.

[Non-Patent document 3] Simon Baker and Takeo Kanade, "Limits on super-resolution and how to break them", IEEE Trans. PAMI, vol. 24, no. 9, Sep., 2002.

SUMMARY OF THE INVENTION

However, the conventional techniques cited above have serious problems. The degree of enhancement of an image signal greatly varies depending on the input image, and in this sense, the technique of Non-Patent document 1, for example, includes the unclear, empirical method of determining parameters indicating the image enhancement degree. Also, since uniform enhancement is applied to the entire image, the occurrence of noise due to the enhancement of high-frequency components is unavoidable.

Also, in the technique of Non-Patent document 2, the validity of associating an image signal before magnification and image pattern after magnification is questionable; a learned magnified image signal does not always correspond to the signal before magnification.

Furthermore, the technique of Non-Patent document 3 more greatly depends on the quality of learned data than the invention of Non-Patent document 2, while it is difficult to obtain general learned data. Moreover, the solution search is extremely time-consuming and not practical. Also, while Patent document 1 uniquely determines parameter values, it is unknown whether the values are applicable to all images.

Accordingly, an object of the present invention is to provide a technique capable of obtaining a high-definition magnified image by simple computation.

In order to solve the problems, the present invention adopts the following means. That is, an image magnification device includes:

a deterioration unit that obtains a deteriorated image on the basis of an input original image;

a filter determining unit that determines enhancement filters for individual small areas of the original image using the deteriorated image at least;

an enhancement unit that performs a filtering process by applying the filters determined by the filter determining unit to the individual small areas to obtain an enhanced image; and a magnification unit that interpolates the image to obtain a magnified image.

The filter determining unit may obtain a characteristic of each small area from the deteriorated image and determine an enhanced filter associated with the characteristic as an enhancement filter used for the small area.

The filter determining unit may obtain results from filtering of each small area of the deteriorated image with a previously prepared plurality of enhancement filters, and on the basis of the results, determine for each small area which enhancement filter is to be used.

The filter determining unit may obtain results from filtering of each small area of the deteriorated image with a plurality of enhancement filters while changing distribution of filter coefficients of the plurality of enhancement filters which provide different degrees of enhancement, and on the basis of the results, determine for each small area which enhancement filter is to be used.

Further, an image magnification method according to the present invention is executed by a computer, the method including:

obtaining a deteriorated image on the basis of an input original image;

determining enhancement filters for individual small areas of the original image using the deteriorated image at least;

performing a filtering process by applying the filters determined by the step of determining to the individual small areas to obtain an enhanced image; and interpolating the image to obtain a magnified image.

The step of determining the enhancement filters may include obtaining a characteristic of each small area from the deteriorated image and determining an enhanced filter associated with the characteristic as an enhancement filter used for the small area.

The step of determining enhancement filters may include obtaining results from filtering of each small area of the deteriorated image with a previously prepared plurality of enhancement filters, and on the basis of the results, determining for each small area which enhancement filter is to be used.

The step of determining enhancement filters may include obtaining results from filtering of each small area of the deteriorated image with a plurality of enhancement filters while changing distribution of filter coefficients of the plurality of enhancement filters which provide different degrees of enhancement, and on the basis of the results, determining for each small area which enhancement filter is to be used.

The present invention may be a program that causes a computer to execute the steps shown above. Also, the present invention may be a recording medium that records the program in a computer-readable manner. Then it is possible to cause a computer to read and execute the program recorded in the recording medium to provide its function.

The computer-readable recording medium refers to a recording medium that stores information, e.g., data, programs, etc., electrically, magnetically, optically, mechanically, or with chemical functions in such a way that a computer can read the information. Such recording media detachable from computers include flexible disks, magneto-optical disks, CD-ROMs, CD-R/Ws, DVDs, DATs, 8-mm tapes, and memory cards.

Such recording media fixed in computers include hard disks and ROMs (read only memories).

DESCRIPTION OF THE DRAWINGS

FIG. 7 is an explanatory diagram illustrating an enhancement filter coefficient.

DETAILED DESCRIPTION OF THE INVENTION

Figure 1:
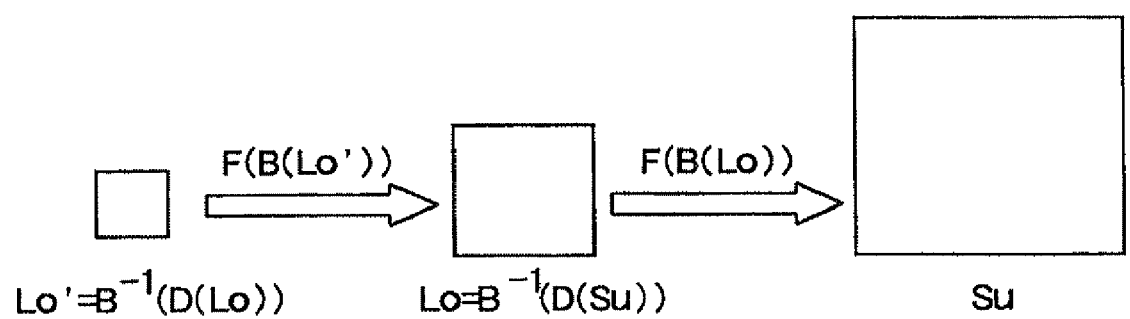
FIG. 1 is an explanatory diagram showing a deteriorated image, an input image, and a magnified image.

Hereinafter, the best mode for carrying out the invention will be described referring to the drawings. The configurations of the embodiments shown below are illustrative and the present invention is not limited to the embodiments.

Principle of the Invention

The present invention realizes high-definition image magnification by performing high-frequency component enhancement. Since directly estimating an image signal for a magnified image, as described in Non-Patent document 3 and Patent document 1, is very time-consuming and not realistic, the present invention generates high-frequency components that would be lost after magnification by adaptively applying enhancement (high-frequency enhancement) to an image signal before magnification. Note that the enhancement processing should be adaptively changed in smooth areas, edge areas, etc. in a scene or an image.

This requires means for adaptively selecting enhancement processing for each small area. The small area means a unit in filtering, which can be one pixel, an M×N pixel block, or an area of hair, skin, etc. in a portrait. In order to find an appropriate degree of enhancement for each small area, the fidelity of the enhanced image with respect to the original image is represented by an estimation function or probability.

A significant difference between the present invention and the inventions of Non-Patent document 3 and Patent document 1 is that the present invention searches a solution space different from those of the cited documents. While Non-Patent document 3 and Patent document 1 search for magnified pixel values, the present invention searches for enhancement filters for enhancing the image before magnification.

Therefore, while the solution searches in Non-Patent document 3 and Patent document 1 are continuous, that of the present invention is discrete. As a result, the present invention enables a considerable reduction of the amount of computation as compared with Non-Patent document 3 and Patent document 1.

The logic described so far can be mathematically represented as below.

DEFINITIONS

Enhanced and magnified high-resolution image: Su
Original low-resolution image (image before being magnified/input image): Lo
Deteriorated image: Lo'
Image blurring function: $D(\ )$
Image enhancement function: $D^{-1}(\ )$
Enhancement transformation of image: $F(\ )=D^{-1}(\ )$
Image magnifying function: $B(\ )$
Image reducing function: $B^{-1}(\ )$
m enhancement filters: $f_i$ (i=0, 1, 2, ..., m)
A set of enhancement filters selected for individual small areas (0, 1, 2, ..., n): $F=\{f_{i(0)}, f_{i(1)}, f_{i(2)}, \ldots f_{i(n)}\}$ With these definitions, as shown in FIG. 1, considering that the image before being magnified is a reduced and deteriorated version of the magnified image, the image magnification method can be expressed as:

$$Lo = B^{-1}(D(Su)) \tag{1}$$

From Expression (1), an enhanced and magnified high-resolution image Su is obtained as:

$$Su = D^{-1}(B(Lo)) = F(B(Lo)) \approx B(F(Lo)) \tag{2}$$

Expression (2) shows a method for obtaining the high-resolution image Su when the low-resolution image Lo is given. That is to say, Su can be obtained by enhancing and then magnifying Lo, or by magnifying and then enhancing Lo. Then, when B is known, the high-resolution image Su is obtained if F can be obtained.

To obtain F, Expression below is defined.

$$E' = (Su - F(B(Lo)))^2 \tag{3}$$

In the expression, F that minimizes E' is computed and then F(B(Lo)) provides Su. However, since Su is unknown, Expression (3) is replaced by:

$$E=(Lo-F(B(Lo)))^2 \quad (4)$$

Note that the relation between Lo and Lo' is as shown in FIG. 1. That is to say, it is assumed that the relation between Su and Lo holds also between Lo and Lo'.

$$Lo'=B^{-1}(D(Lo)) \quad (5)$$

Expression (5) is substituted in Expression (4) to obtain the expression:

$$E=(Lo-F(B(B^{-1}(D(Lo)))))^2=(Lo-F(D(Lo)))^2 \quad (6)$$

Expression (6) is called likelihood, and F that minimizes the likelihood corresponds to an optimum enhancement filter. The image magnification computes F that satisfies Expression (6) about the image Lo before magnification. However, it is more desirable to determine elements of F for individual small areas, as $f_0, f_1, \ldots, f_i \ldots$, than to determine one F for one image. This is because an image includes small areas that do not require much enhancement and areas that require enhancement, and adaptively selecting filters is preferable in order to control the degree of edge enhancement for each small area.

The expression below is also obtained from Expression (1).

$$E=(Lo-B^{-1}(D(F(B(Lo)))))^2 \quad (7)$$

In Expression (7), the likelihood corresponds to a square error of the original image and an image obtained by magnifying/enhancing the original image and further deteriorating/reducing the high-resolution image thus obtained. The use of Expression (7) in place of Expression (6) provides an equivalent effect. The following description is made only on the basis of Expression (6).

Figure 2:
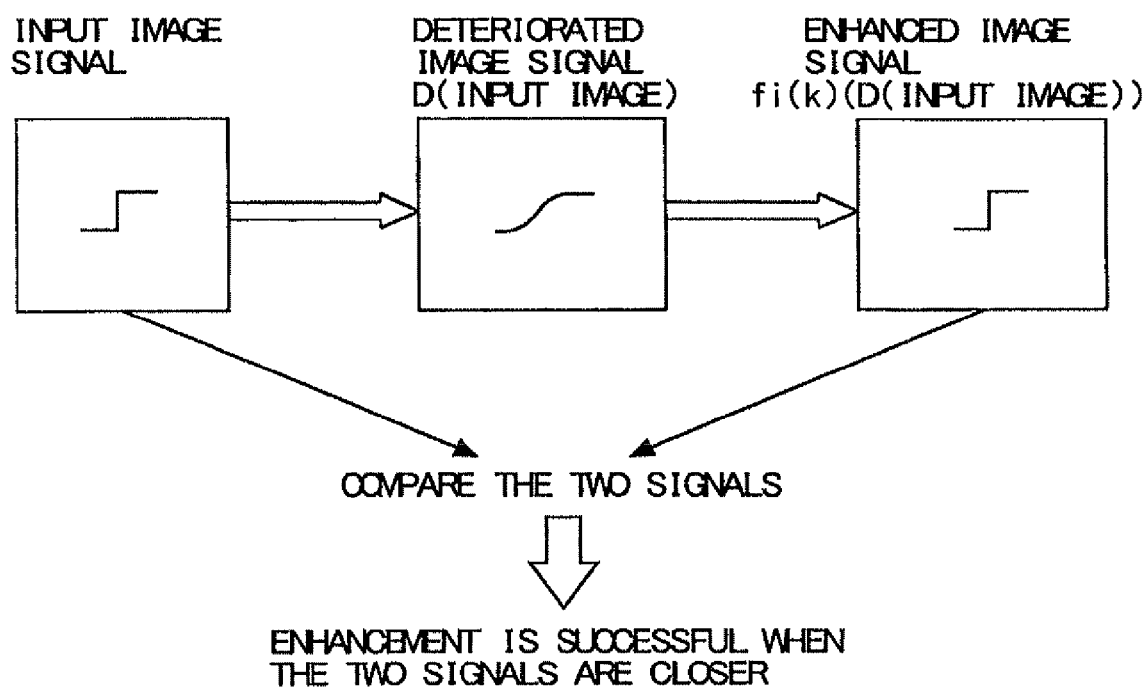
FIG. 2 is an explanatory diagram illustrating an enhancement process.

Expression (6) is developed at the small area level to obtain the expression:

$$e_k=(l_k-f_{i(k)}(D(l_k)))^2 \quad (8)$$

Where $l_k$ is a characteristic value of a small area k of the image Lo before being magnified. Various characteristic values can be used; for example, when the small area is set as a pixel, it can be a pixel value, when the small area is an M×N block, it can be a mesh feature or a direction feature, and when it is an area like hair or human skin in a portrait, it can be a texture characteristic. FIG. 2 shows the meaning of Expression (8). On the assumption that (a low-resolution image)=(an image obtained by deteriorating and reducing a high-resolution image), in order to obtain a high-resolution image from a low-resolution image, a filter $f_{i(k)}$ is selected so that the low-resolution image once deteriorated and then enhanced with the enhancement filter $f_{i(k)}$ corresponds to the original low-resolution image.

In actual image magnification, plural kinds of enhancement filters $f_i$ are prepared in advance and a filter is selected for each small area using Expression (8). After selecting filters, the image is magnified using Expression (2). The filtering is applied to the image before magnification or to the image after magnification.

First Embodiment

Figure 3:
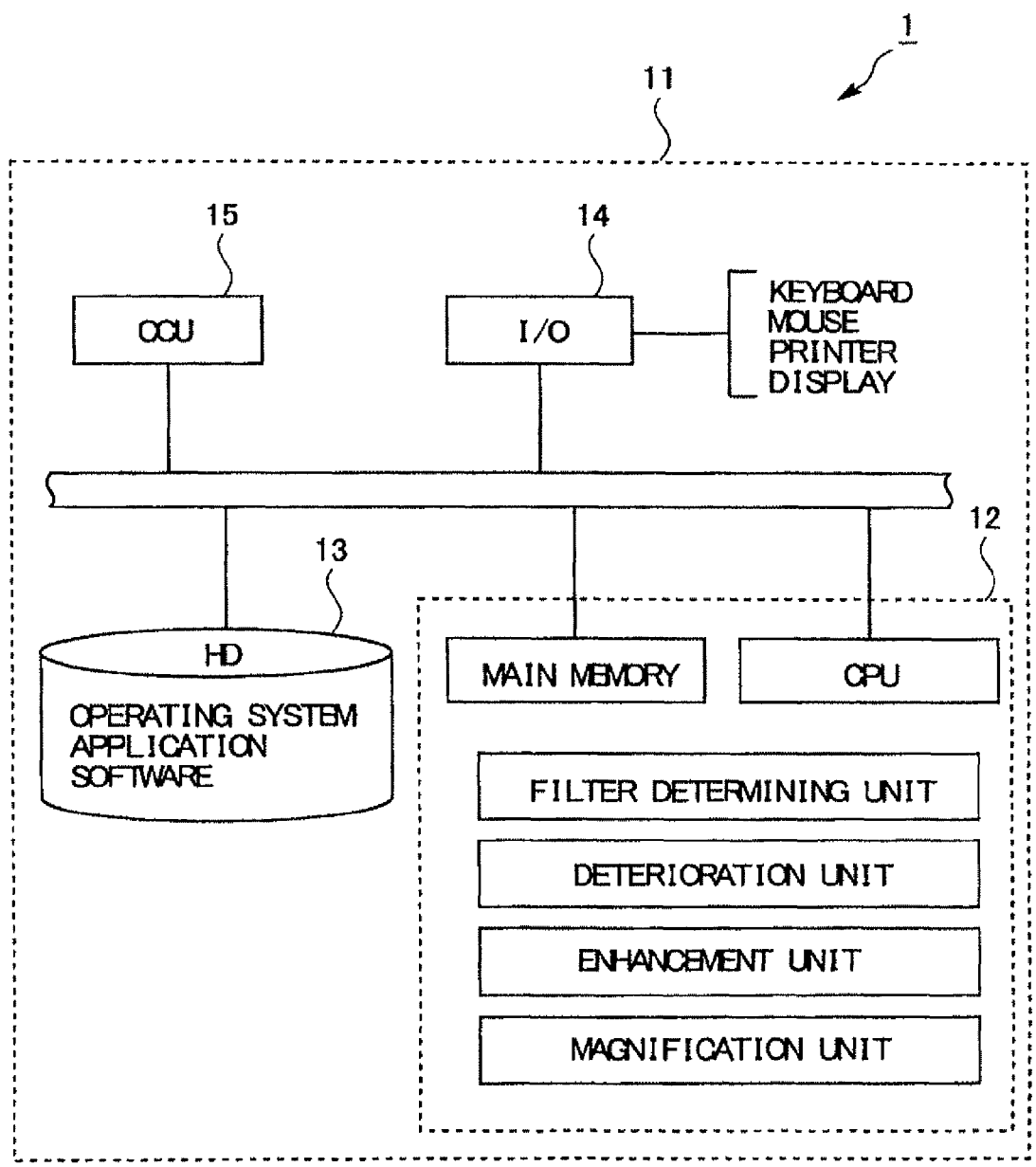
FIG. 3 is a schematic diagram illustrating a configuration of an image magnification device.

FIG. 3 is a schematic diagram showing the configuration of an image magnification device according to the present invention. As shown in FIG. 3, the image magnification device 1 of the embodiment is a common computer that has an operating unit 12 including a main memory and a CPU, a storage unit (hard disk) 13, and an input/output unit 14.

The storage unit 13 stores an operation system and application programs (an image magnification program etc.).

The input/output unit 14 is for connection with output devices like a display (a display unit) or a speaker and input devices like a keyboard or a microphone, and also for connection with input/output devices like an FD drive or a CD-ROM drive and input/output ports like USB or IEEE1394, for input/output of images.

The operating unit 12 reads and executes programs stored in the storage unit 13 for image magnification etc. In particular, in the embodiment, the operating unit 12 executes steps of an image magnification program to function as a deterioration unit, a filter determining unit, an enhancement unit, and a magnification unit.

The deterioration unit obtains a deteriorated image on the basis of an input original image.

The filter determining unit divides the deteriorated image obtained by the deterioration unit into small areas, obtains their characteristic values, and determines enhancement filters associated with the characteristic values as enhancement filters to be used for the individual small areas.

The enhancement unit performs filtering by applying the filters determined by the filter determining unit to the corresponding small areas, so as to obtain an enhanced image.

The magnification unit interpolates the image to obtain a magnified image.

While the image magnification device 1 of the embodiment is a general-purpose computer that realizes the deterioration unit, filter determining unit, enhancement unit, and magnification unit by operating according to software (image magnification program), the image magnification device of the present invention is not limited to the example. For example, it can be an electronic device having electronic circuitry (hardware) specially designed to realize the functions of these units.

Figure 4:
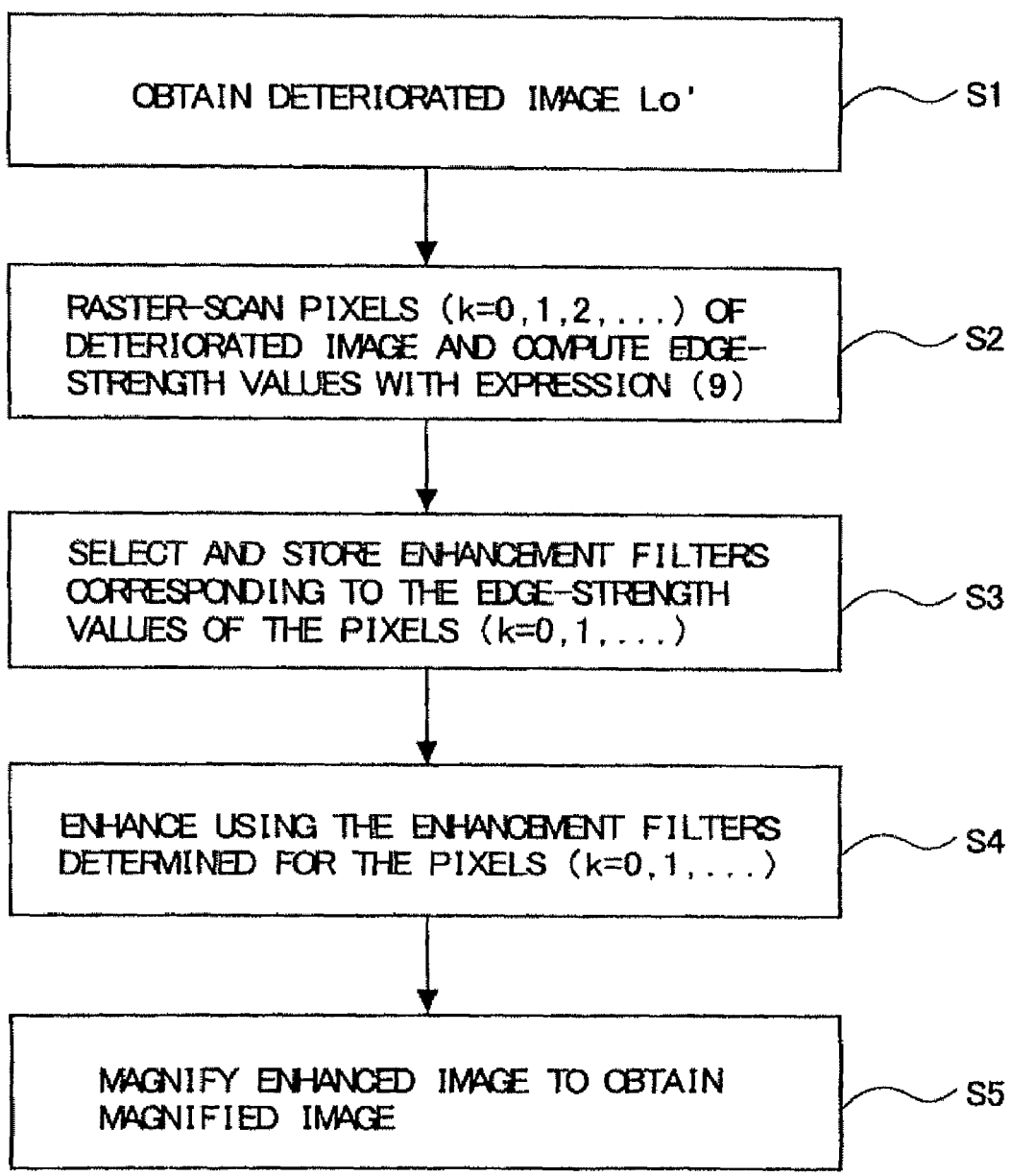
FIG. 4 is an explanatory diagram showing a magnification method according to a first embodiment.

An image magnification method according to the embodiment, which is carried out by the image magnification device thus structured is now described referring to FIG. 4.

First, when an image is inputted through the input/output unit 14, the operating unit stores the input image in a memory and also obtains a deteriorated image with the function of the deterioration unit on the basis of a given deteriorating function. For example, as shown in FIG. 1, the deteriorated image Lo' is obtained from the input image Lo according to the relation Lo'=$B^{-1}$(D(Lo)) (Step 1: hereinafter steps are referred to simply like S1).

Next, the filter determining unit obtains characteristic values of individual small areas with the deteriorated image. In the embodiment, the small area is defined as one pixel and the filter determining unit obtains edge strength value for each pixel as the characteristic value of the small area.

The edge strength is defined by Expression (9), for example.

$$u(l_k) = \frac{8l_k - \sum_\theta D(l_{k\pm\theta})}{8D(l_k) - \sum_\theta D(l_{k\pm\theta})} \quad (9)$$

Figure 6:
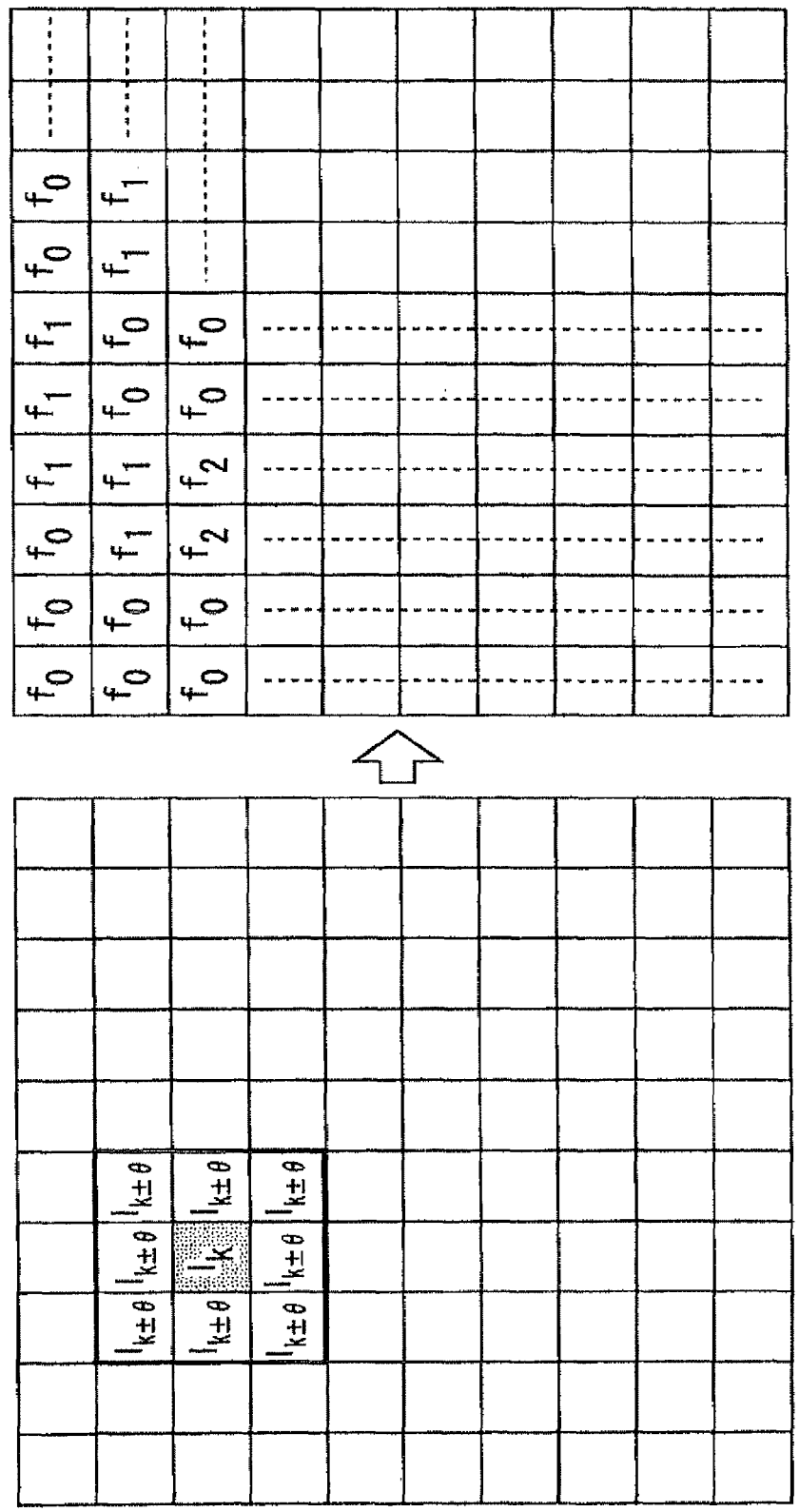
FIG. 6 is an explanatory diagram illustrating selection of filters.

In the expression, as shown in FIG. 6, k±θ represents pixels around k.

The filter determining unit raster-scans the deteriorated image, i.e., sequentially reads pixels like scanning lines of a television image (hereinafter such reading is referred to simply as raster scanning) to obtain pixel values and calculates characteristic values (edge-strength values) of the small areas according to Expression (9) (S2).

Figure 5:
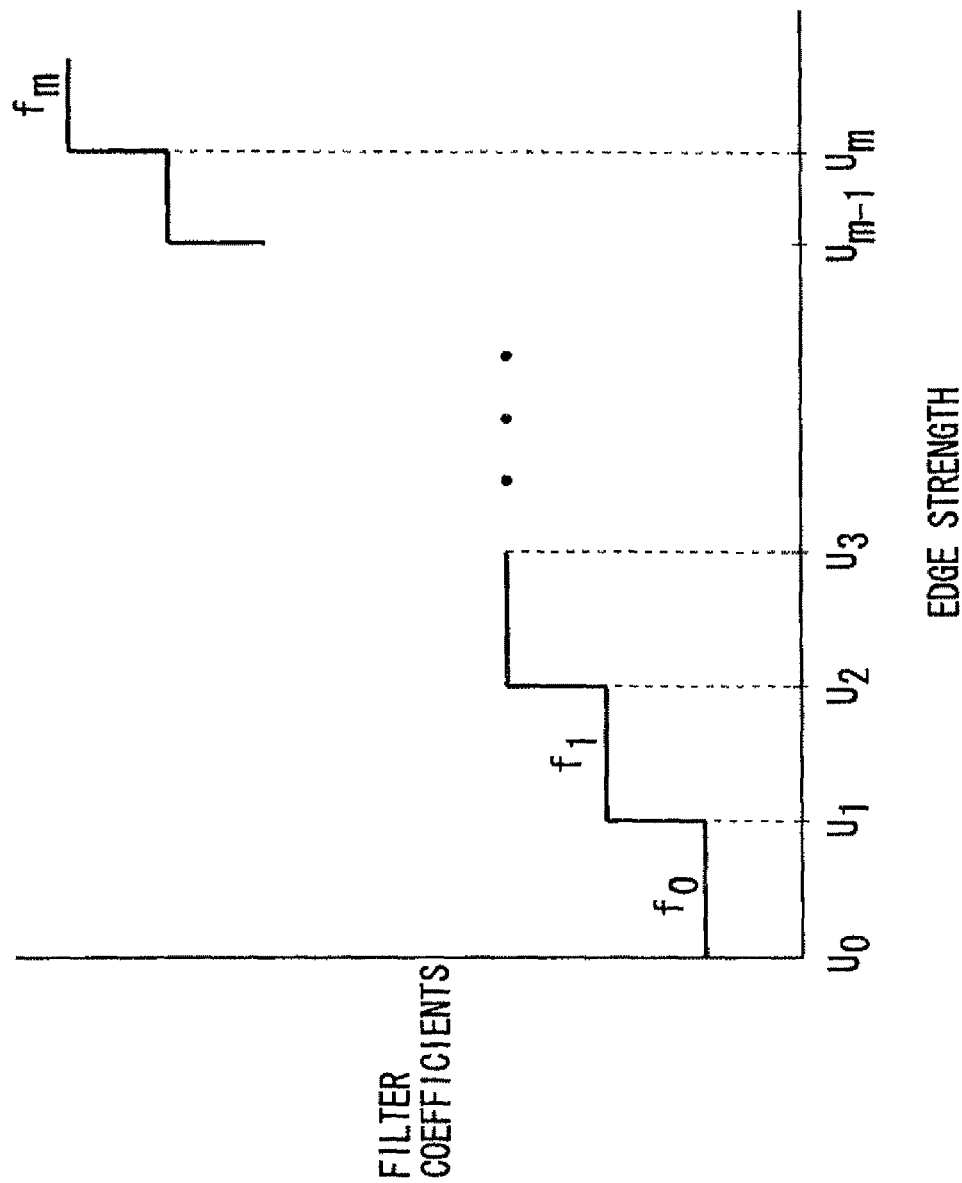
FIG. 5 is a diagram illustrating association between edge strength and enhancement filters.

As shown in FIG. 5, the filter determining unit previously stores a filter table which associates enhancement filters $f_0$ to $f_m$ having different filter coefficients with edge-strength values, as the filter $f_0$ for edge strength U of $U_0 \leq U < U_1$, the filter $f_1$ for $U_1 \leq U < U_2$, the filter $f_2$ for the pixel value U of $U_2 \leq U < U_3$, and so on. The filter determining unit refers to the filter table to obtain enhancement filters corresponding to the edge-strength values of the individual pixels, determines to use the enhancement filters for the corresponding pixels of the input image, and temporarily stores the data in a memory (S3).

Next, the enhancement unit raster-scans the input image and performs enhancement with the enhancement filters determined for individual pixels (S4), and the magnification unit magnifies the enhanced image to obtain a magnified image (S5). That is to say, the computation of Expression (2) is performed using the enhancement filters (functions for enhancing the image) for individual pixels of the input image to implement enhancement and magnification. The enhancement process is performed by enhancement filters as shown in FIG. 7 for each small area. The arrangement of FIG. 7 shows a computation of multiplying neighboring pixels by coefficients according to the locations and obtaining a sum. In the embodiment, the filter coefficient values of the enhancement filters are set in advance. The magnification process is achieved by a well-known interpolation method, for example. Step 4 of enhancing the image and Step 5 of magnifying the image may be performed in reverse order, meaning that the input image may be magnified (S5) and then enhanced (S4), which provides an equivalent effect.

As described so far, according to the embodiment, an appropriate enhancement filter is selected for each small area to achieve enhancement, which provides a high-definition magnified image with simple computation.

Also, since the embodiment uniquely obtains an enhancement filter from the edge strength of each small area, appropriate enhancement filters can be obtained by raster-scanning the deteriorated image just once, which enables relatively high-speed processing.

Second Embodiment

Figure 8:
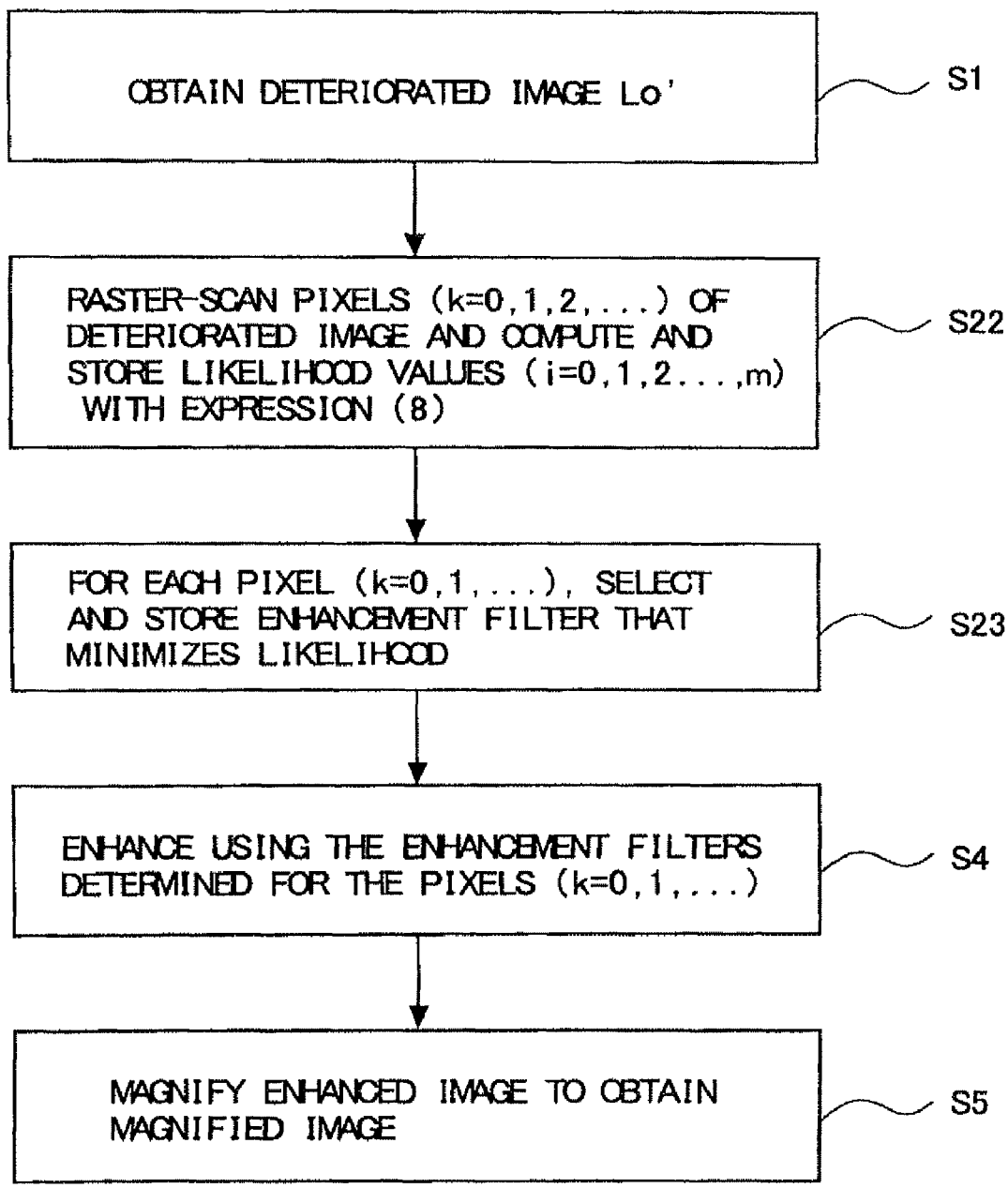
FIG. 8 is an explanatory diagram showing a magnification method of a second embodiment.

FIG. 8 is an explanatory diagram showing the image magnification method according to a second embodiment. In the embodiment, the filter determining unit determines filters in away different from that of the first embodiment. In other respects, the two embodiments are configured the same, and therefore the same components are not described again here.

In the embodiment, a plurality of (m) enhancement filters $f_i$ (i=1, 2, 3, . . . m) with different filter coefficients are prepared in advance and stored in a memory etc. so that the filter determining unit can refer to the filters. Then, after a deteriorated image is obtained as described earlier, the filter determining unit raster-scans the deteriorated image and performs the computation of Expression (8) m times for each pixel using the plurality of enhancement filters, so as to obtain the likelihood $e_k$ with each enhancement filter (S22). Then it determines and stores the filter fi (k) that minimizes the likelihood $e_k$ as the enhancement filter for the pixel (S23).

After determining enhancement filters for all pixels, the original image (the image before deteriorated) is enhanced in a manner as described in the first embodiment and then magnified. The enhancement may be performed after magnifying the original image by interpolation, which provides an equivalent effect.

Thus, the embodiment allows selection of optimum enhancement filters by obtaining likelihood values with a plurality of enhancement filters having filter coefficients being constants and then selecting filters minimizing the likelihood values.

Third Embodiment

Figure 9:
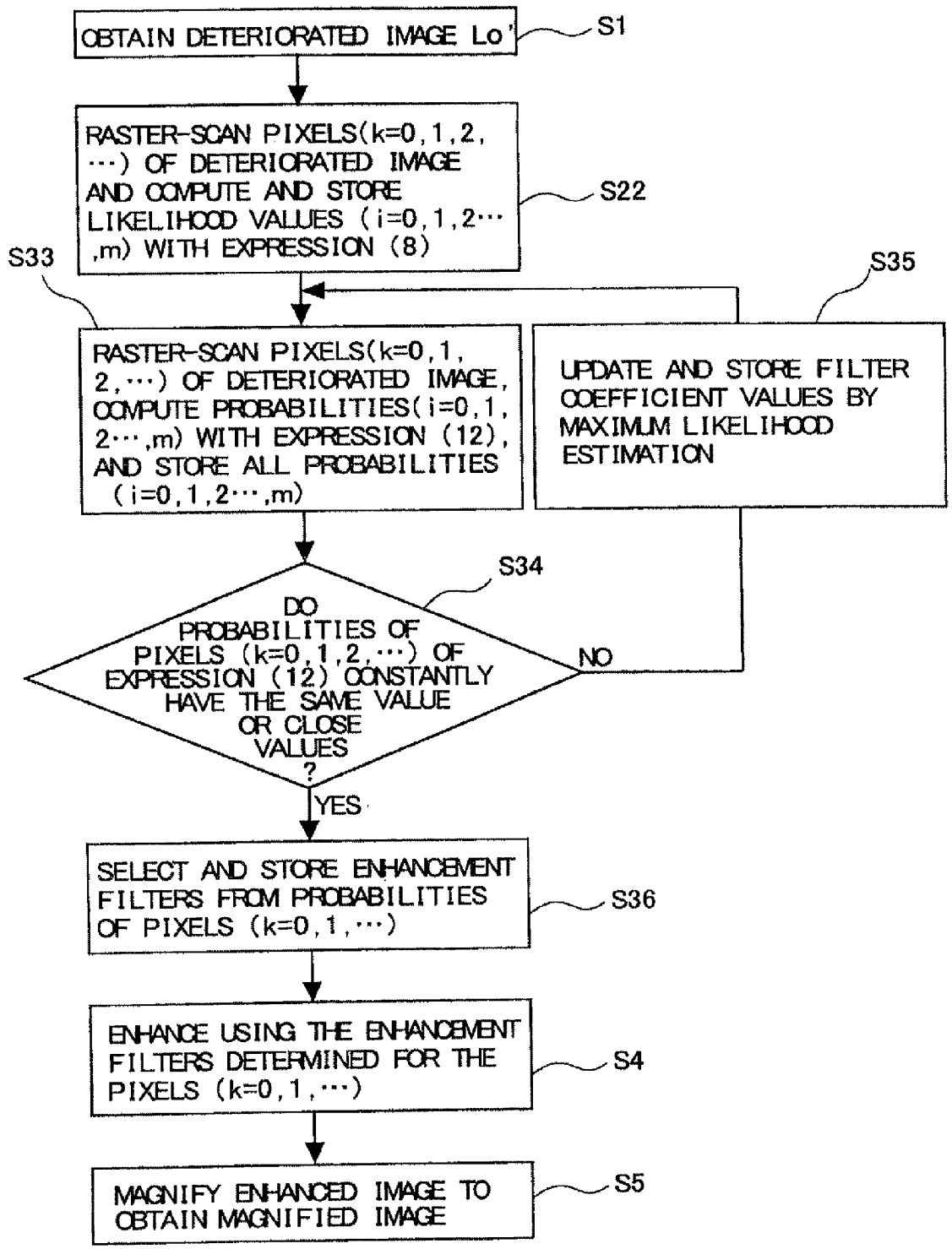
FIG. 9 is an explanatory diagram showing a magnification method of a third embodiment.

FIG. 9 is an explanatory diagram showing the image magnification method according to a third embodiment. In the embodiment, the filter determining unit determines filters in away different from that of the first embodiment. In other respects, the two embodiments are configured the same, and therefore the same components are not described again here.

First, after a deteriorated image is obtained as described earlier, the filter determining unit raster-scans the deteriorated image in Step 32, performs for each pixel the computation of Expression (8) m times using a plurality of enhancement filters, and obtains and stores the likelihood $e_k$ with each enhancement filter (S22). Then, with Expression (12), the probabilities $p(f_{i(k)})$ indicating the degree of enhancement filter adaptability for each small area are obtained (S33), and the probabilities $p(f_{i(k)})$ are obtained with parameter values, such as filter coefficients, updated by maximum likelihood estimation, which is repeated until the probabilities $p(f_{i(k)})$ constantly have the same value or close values (S34 to S35). The embodiment shows an example using the EM algorithm for the updating of parameters (S35). The EM algorithm is formed of two steps called E-Step and M-step. The E-Step computes an expectation of logarithmic likelihood about an unknown parameter (F herein). An initial value of $F^t$ is given and Expression (10) is computed on the basis thereof (E-Step). Where $P(f_{i(k)})$ is the probability indicating the degree of enhancement filter adaptability for each small area. A value $f^t_{i(k)}$ is an element of $F^t$. According to Expression (11), the M-step obtains F that maximizes Expression (10), which is taken as $F^{t+1}$. $F^{t+1}$ thus obtained is substituted with $F^t$ in Expression (10), which is repeated after that.

$$Q(F, F^t) = \sum_i \sum_k p(f^t_{i(k)})\log p(f_{i(k)}) \qquad (10)$$

$$F^{t+1} = \underset{F}{\operatorname{argmax}} Q(F, F^t) \qquad (11)$$

After updating filter coefficients, the probability $p(f_{i(k)})$ is obtained again with Expression (12) (S33), the expectation of Expression (10) is computed using it, and parameters including filter coefficients satisfying Expression (11) are obtained.

$$p(f_{i(k)}) = \frac{1}{Z_k} \frac{1}{\sqrt{2\pi\sigma_i^2}} \exp\left[-\frac{e_k}{4\sigma_i^2}\right] \qquad (12)$$

$$Z_k = \sum_i \frac{1}{\sqrt{2\pi\sigma_i^2}} \exp\left[-\frac{e_k}{4\sigma_i^2}\right]$$

In the expression, $Z_k$ is a partition function and $\sigma_i^2$ is the variance of $e_k$.

When the process is performed several times, then $p(f_{i(k)})$ becomes nearly unchanged. Whether the variation range is not more than a given value is determined (S34), and when the variation is not more than the given value, the process moves to the next step, regarding the solution as having converged. Subsequently, for each small area, an enhancement filter with the highest probability $P(f_{i(k)})$ is determined and stored as the enhancement filter to be used for that small area (S36).

Then, using the enhancement filters thus determined, the input image is enhanced as described earlier and magnified. The enhancement process may be performed after magnifying the original image by interpolation, which provides an equivalent effect.

As described so far, the embodiment is capable of performing enhancement suitably for features of the input image by simultaneously performing estimation of filter coefficients and filter selection for each small area in the process of selecting enhancement filters.

The use of the present invention provides a high-definition magnified image with simple computation.

What is claimed is:

1. An image magnification device, comprising
At least one computer including:
  a deterioration unit that obtains a deteriorated image on the basis of an input original image; a filter determining unit that determines enhancement filters for individual small areas of the original image using the deteriorated image at least;
  an enhancement unit that performs a filtering process by applying the filters determined by the filter determining unit to the individual small areas of the original image to obtain an enhanced image;
  and a magnification unit that interpolates the enhanced image to obtain a magnified image,
  wherein results are obtained from filtering of each small area of the deteriorated image that corresponds to the small area's of the original image with a previously prepared plurality of enhancement filters, and on the basis of the results, the filter determining unit determines for each small area of the original image which enhancement filter is to be used.

2. The image magnification device according to claim 1, wherein results are obtained from filtering of each small area of the deteriorated image with a plurality of enhancement filters while changing distribution of filter coefficients of the plurality of enhancement filters which provide different degrees of enhancement, and on the basis of the results, the filter determining unit determines for each small area of the original image which enhancement filter is to be used.

3. An image magnification method which is executed by a computer, comprising:
  obtaining a deteriorated image on the basis of an input original image;
  determining enhancement filters for individual small areas of the original image using the deteriorated image at least;
  performing a filtering process by applying the filters determined by the determining of the enhancement filters for the individual small areas of the original image to obtain an enhanced image;
  and interpolating the enhanced image to obtain a magnified image,
  wherein the determining of enhancement filters includes obtaining results from filtering of each small area of the deteriorated image that corresponds to the small area's of the original image with a previously prepared plurality of enhancement filters, and on the basis of the results, determining for each small area of the original image which enhancement filter is to be used.

4. The image magnification method according to claim 3, wherein the determining of enhancement filters includes obtaining results from filtering of each small area of the deteriorated image with a plurality of enhancement filters while changing distribution of filter coefficients of the plurality of enhancement filters which provide different degrees of enhancement, and on the basis of the results, determining for each small area of the original image which enhancement filter is to be used.

* * * * *

UNITED STATES PATENT AND TRADEMARK OFFICE
CERTIFICATE OF CORRECTION

| | | |
|---|---|---|
| PATENT NO. | : 7,953,298 B2 | Page 1 of 1 |
| APPLICATION NO. | : 12/272353 | |
| DATED | : May 31, 2011 | |
| INVENTOR(S) | : Kensuke Kuraki et al. | |

It is certified that error appears in the above-identified patent and that said Letters Patent is hereby corrected as shown below:

Column 9, Line 14, In Claim 1, after "comprising" insert --:--.

Column 9, Line 15, In Claim 1, delete "At" and insert --at--, therefor.

Column 9, Line 29, In Claim 1, delete "area's" and insert --areas--, therefor.

Column 10, Line 21, In Claim 3, delete "area's" and insert --areas--, therefor.

Signed and Sealed this
Eighteenth Day of October, 2011

David J. Kappos
*Director of the United States Patent and Trademark Office*